No. 893,641. PATENTED JULY 21, 1908.
P. MOEWS.
EYEGLASSES.
APPLICATION FILED JAN. 29, 1908.
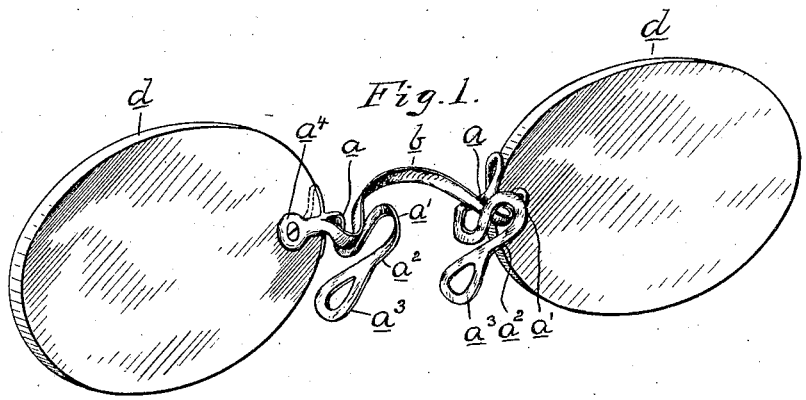
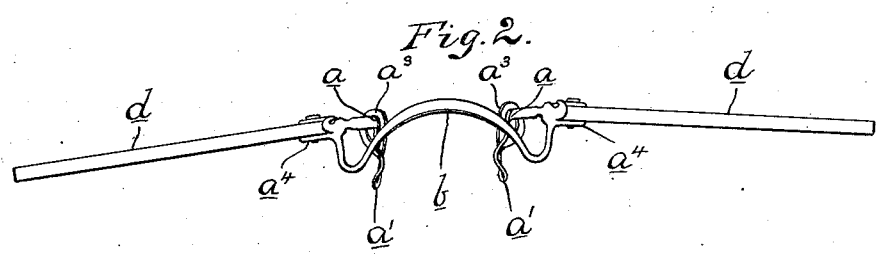
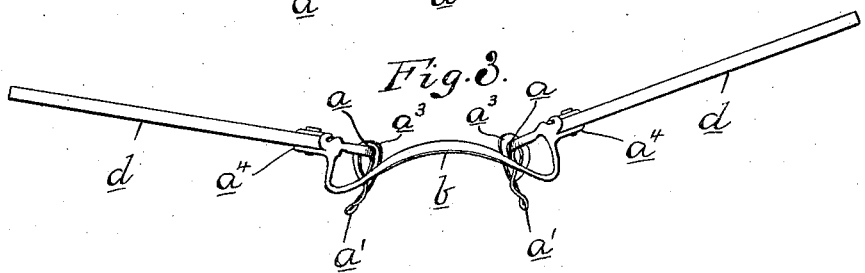
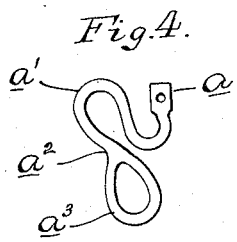
Inventor
Paul Moews
Witnesses
Lewis E. Flanders
Tina E. Mertz
By Charles H. Fisk
Attorney

UNITED STATES PATENT OFFICE.

PAUL MOEWS, OF DETROIT, MICHIGAN.

EYEGLASSES.

No. 893,641.

Specification of Letters Patent.

Patented July 21, 1908.

Application filed January 29, 1908. Serial No. 413,157.

*To all whom it may concern:*

Be it known that I, PAUL MOEWS, a citizen of the United States, residing at Detroit, in the county of Wayne and State of Michigan, have invented certain new and useful Improvements in Eyeglasses, of which the following is a specification.

My invention relates to improvements in eyeglasses and is shown in the accompanying drawing in which:

Figure 1 is a perspective view of a pair of eye-glasses showing my invention; Fig. 2 is a plan view showing the eye-glasses in their normal position; Fig. 3 is a similar plan view showing the position of the parts when the bridge spring is sprung to engage it with the nose; Fig. 4 is a view showing the construction of the nose-guard when designed to be engaged with studs in that form of construction in which the nose-guards and bridge spring are made from separate pieces of metal.

My invention relates to that class of eye-glass frames in which the nose-guards are made from a single piece of spring wire and particularly to that class in which spring loops are used for the nose-guards. Heretofore in the construction of these devices, those nose-guards which have employed the two loops or a like construction, have consisted in the spring wire being first carried downward some considerable distance and then bent into a return loop forming the lower end of the nose-guard; it is then carried upward with a return loop forming the upper loop of the nose-guard, and this upper loop, which is formed on the free end of the spring wire, has been commonly located between the lenses and adjacent to the plane of the bridge spring so that, when the device is placed on the nose, the loops on the free ends of the spring wires forming the nose-guards have been designed to hold the glasses in place. In this old form of construction the lower loop is the more rigid owing to the fact that it is connected directly with the ear or stud and therefore when the glasses are placed on the nose, the greater resistance to the action of the bridge spring in forcing the nose-guards against the nose comes on the lower or more rigid loop as a matter of fact and as these loops are located out of the plane of the bridge spring the resistance that they offer to the action of the bridge tends to twist the glasses from the face rather than to hold them in place.

In my construction shown herein, the spring wire of which the nose-guard is made, proceeds rearwardly from its connection with the ears $a^4$ at $a$ only a sufficient distance to clear the bridge spring $b$ and then extends upwardly to bring the first loop $a'$ approximately within the plane of the bridge spring $b$. It then extends downwardly through the portion $a^2$ and forms the lower loop $a^3$, this lower loop being set forward a sufficient distance to bring it substantially in line with the plane of the lenses $d\,d$ and with the center or fulcrum of the bridge spring $b$.

By reference to Fig. 1 the upper loop $a'$ is shown to be within and between the ends of the bridge spring $b$ and consequently some considerable distance back of the center or fulcrum of the bridge spring as shown in Fig. 2. This location of this first loop is such that when the bridge spring is expanded as shown in Fig. 3, the axis of rotation being substantially the center of the bridge spring, the loops $a'$ are separated or carried outward and thereby prepared to engage with the nose, and when so engaged with the nose they grip it firmly by reason of the fact that they are comparatively rigid, the loop being formed near the supported end of the spring wire. By carrying the ends of the bridge-spring backward from the ears, the center of the bridge will be close to the nose of the wearer and by locating the holding-loops between these rearwardly extending ends the force of the bridge-spring is applied where most effective, *i. e.*, inward upon the holding-loops. The loops $a^3$, however, being extended forward sufficiently to bring them in line with the center of the bridge spring and with the center of rotation of the parts when the spring is expanded are separated a less distance than the loops $a'$ and when the eye-glasses are attached to the nose these lower loops $a^3$ being located on and formed from the outer or free end of the spring metal have greater resiliency and press less firmly on the face than the loops $a'$. The function of the lower loops is mainly to keep the glasses from rotating on the nose, the loops $a'$ being relied upon principally to hold the glasses in place.

Fig. 4 is designed to show the variation in which the upper loop $a'$ is to be engaged with the stud of the glasses, leaving the free or resilient loop $a^3$ extending downward.

The advantages of my invention are a firmer hold on the nose due to the direct application of the force of the bridge-spring, accomplished by locating the loops having the greatest resisting power in the plane of and between the ends of said spring; the elimination of any tendency to tilt owing to the action of the bridge-spring; and the holding of the glasses in their proper position upon the nose without interfering with the application of the force of the bridge-spring where most effective.

Having described my invention what I claim is:

1. In eye-glasses, a nose-guard consisting of an upper and lower loop of spring metal, said nose-guard being supported from the eye-glass frame by the upper loop which is located substantially in the plane of the bridge-spring of said frame, whereby greater resiliency is given to the lower loop which is located below the plane of said spring.

2. In eye-glasses, nose-guards consisting of a double loop formed from a single continuous strip of spring metal, said nose-guard being supported from the eye-glass frame from the upper loop which is located substantially in the plane of the bridge-spring, whereby greater resiliency is given to the lower loop and the force of the bridge-spring taken by the more rigid upper loop.

3. In eye-glasses, the combination of the bridge spring, the ears to connect the bridge with the lenses and nose-guards consisting of an upper and lower loop formed from a single strip of spring metal and connected with the ears through the upper loop, said upper loop being located approximately in the plane of and between the ends of the bridge, whereby the loop of the greater rigidity receives the thrust of the bridge spring substantially as described.

4. In eye-glasses, the combination with an eyeglass-frame and its bridge spring, of nose-guards formed from a single strip of spring metal attached to the frame near the ends of the bridge at one end and extending upwardly therefrom and thence downwardly forming the loop $a'$, thence downwardly from said loop to form the loop $a^3$ at the free end of the spring strip substantially as described.

5. In eye-glasses, the combination of the bridge spring, the ears, and the nose-guard consisting of an upper and lower loop formed from a single strip of spring metal and connected with the ears by the upper loop, said upper loop located approximately on a line with and between the ends of the bridge spring and the lower loop located approximately on a line with the lenses and center of the bridge spring below the plane of said bridge, whereby the upper loops are caused to separate a greater distance in expanding the bridge spring to engage the glasses with the face and the lower loops are free to yield independently of the bridge-spring.

6. In eye-glasses, the combination of an eyeglass-frame having ears, a bridge-spring attached at its ends to the frame near said ears and extending rearwardly therefrom, nose-guards formed from a strip of spring metal each supported from the eyeglass-frame at one end and bent to form an upper loop adjacent to said end and extending downward and formed into a lower loop at its free end, said upper loop being supported substantially in the plane of the bridge-spring and between the rearwardly extending ends of said spring, and the lower loop being supported below the plane of the bridge-spring and forward of its rearwardly extending ends.

In testimony whereof I affix my signature in presence of two witnesses.

PAUL MOEWS.

Witnesses:
MARION M. THOMSON,
A. O. LITTLE.